Dec. 19, 1961 H. E. FOX ET AL 3,013,442
ENGINE-TRANSMISSION CONTROL FOR MOTOR VEHICLES AND THE LIKE
Filed March 6, 1959 5 Sheets-Sheet 1
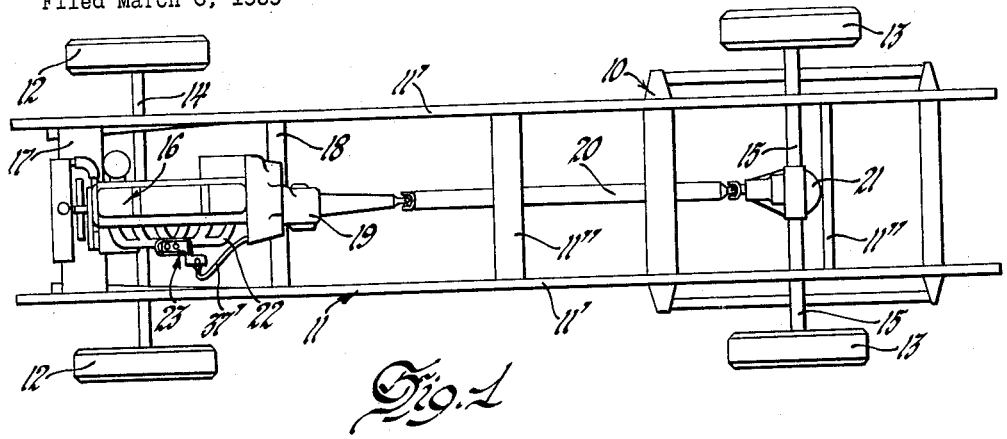
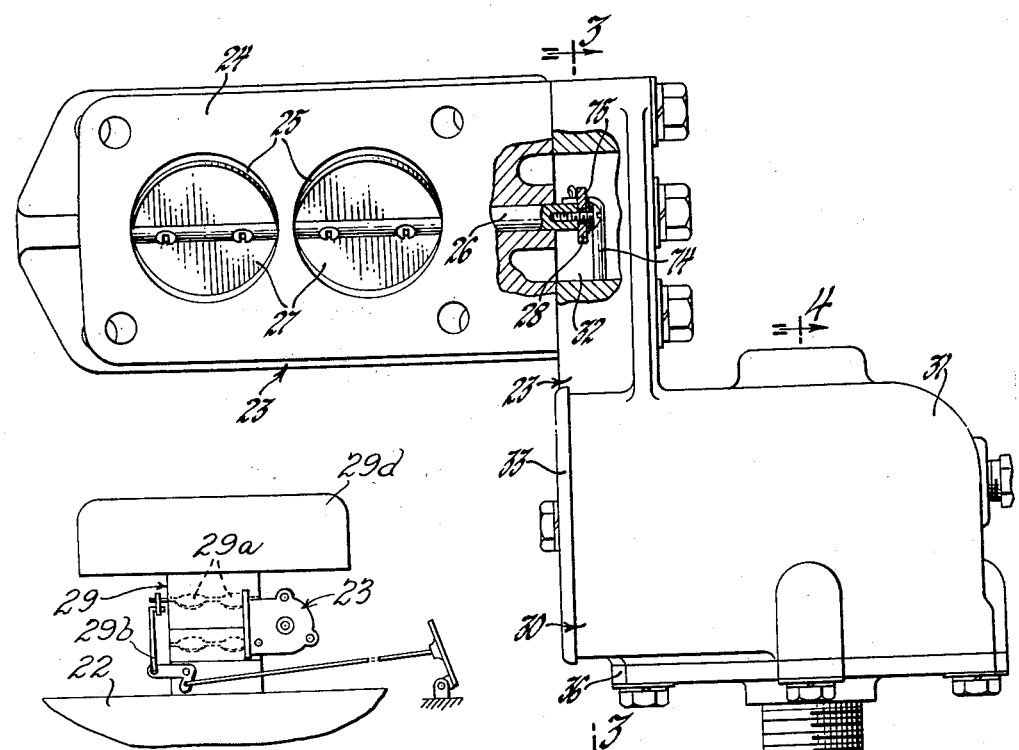
INVENTORS
Harold E. Fox &
BY Wallace M. Kennedy
ATTORNEY Dec. 19, 1961  H. E. FOX ET AL  3,013,442
ENGINE-TRANSMISSION CONTROL FOR MOTOR VEHICLES AND THE LIKE
Filed March 6, 1959  5 Sheets-Sheet 2

INVENTORS
Harold E. Fox &
Wallace M. Kennedy
BY
L. A. Burch
ATTORNEY

Dec. 19, 1961   H. E. FOX ET AL   3,013,442
ENGINE-TRANSMISSION CONTROL FOR MOTOR VEHICLES AND THE LIKE
Filed March 6, 1959   5 Sheets-Sheet 3

INVENTORS
Harold E. Fox &
Wallace M. Kennedy
BY
L.D. Burch
ATTORNEY

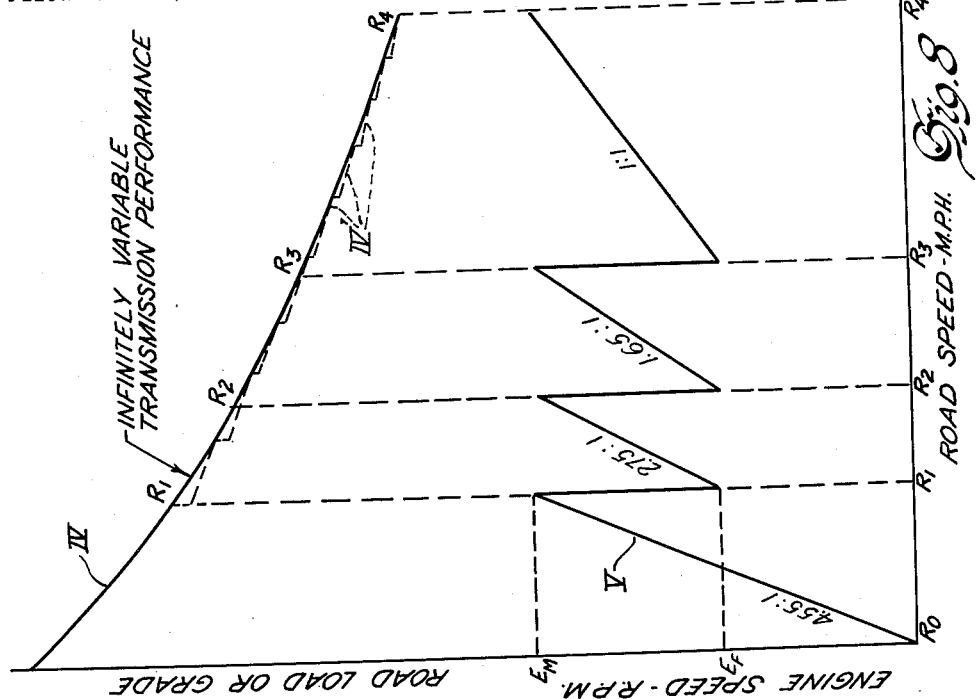
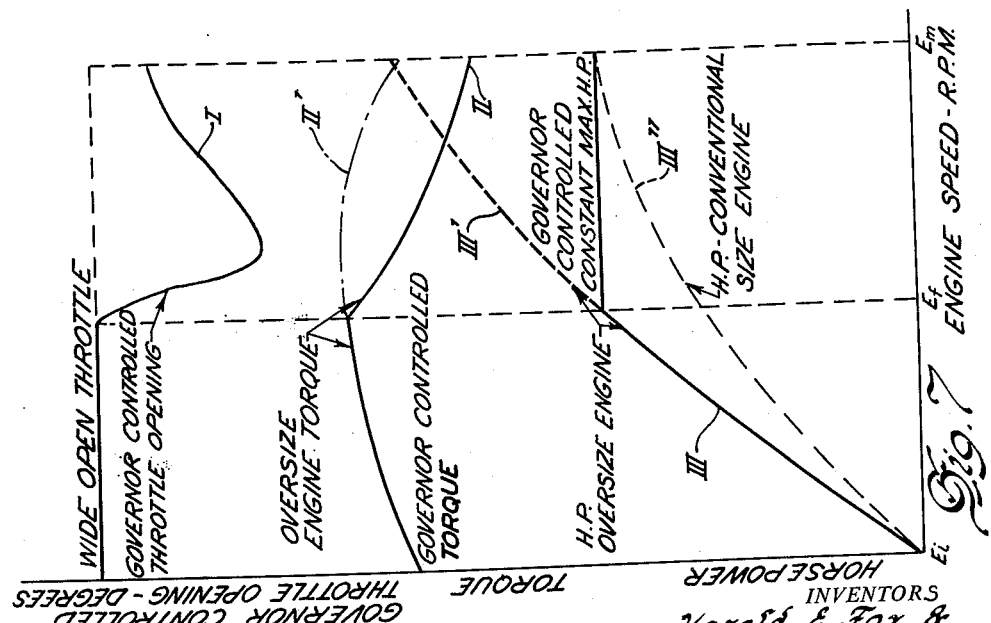

Dec. 19, 1961  H. E. FOX ET AL  3,013,442
ENGINE-TRANSMISSION CONTROL FOR MOTOR VEHICLES AND THE LIKE
Filed March 6, 1959  5 Sheets-Sheet 5

INVENTORS
Harold E. Fox &
BY Wallace M. Kennedy

ATTORNEY 3,013,442
ENGINE-TRANSMISSION CONTROL FOR MOTOR VEHICLES AND THE LIKE
Harold E. Fox, Pontiac, and Wallace Murray Kennedy, Bloomfield Hills, Mich., assignors to General Motors Corporation, Detroit, Mich., a corporation of Delaware
Filed Mar. 6, 1959, Ser. No. 797,652
9 Claims. (Cl. 74—472)

This invention relates to a power unit for a motor vehicle; more particularly to such a power unit including an internal combustion engine and a transmission selectively operable to provide a plurality of different drive ratios intermediate the engine and the engine-driven load, such as the driven vehicle wheels; and with regard to certain more specific aspects of the invention to control means for regulating and coordinating the operation of the engine and the transmission.

Heretofore, truck and highway tractor engines have generally been designed or selected to provide a maximum peak horsepower substantially equal to or slightly in excess of that required for driving the truck at a predetermined level highway speed which generally corresponds to that required for the maintenance of desired schedules. This predetermined straightaway speed is normally about 55 miles per hour, the legal limit for such vehicles in most states. Since operating economy is a prime consideration in any trucking operation, acceleration performance has generally been of little consequence. For maximum engine operating economy, it is desirable to operate such an engine at or near its maximum rated horsepower and speed irrespective of the truck road speed. To permit such engine operation, it has been necessary to provide a relatively heavy, expensive and complicated multi-shift transmission having a considerable number of closely spaced drive gear ratio steps and to shift such a transmission whenever the load changes slightly to allow the engine operation to be retained at or near peak power and speed irrespective of truck road speed. With a heavily loaded truck, this arrangement necessitates a continual shifting of the transmission to maintain proper engine speed thus impairing truck performance. Due to the excessive cost and complication of providing suitable automatic shift operation, such multi-shift transmissions are generally manually operated. Such continual manual shifting required of the operator is both fatiguing and distracting and generally impairs the operator's driving efficiency.

Since the displacement or power of an engine may be increased very economically both in cost and weight, the invention contemplates using an engine of a size which has a displacement and power normally in excess of that which would be required to maintain the desired straightaway or level road speed. This oversize engine is coupled to the drive train of the vehicle and the several vehicle driving wheels through a relatively simple and inexpensive transmission which may be of either an automatic or manual shift type having only a limited number of shifts. To permit the use of such a limited ratio transmission the engine is adapted to maintain the power output of the engine at a relatively constant maximum level over a substantial portion of the upper speed range of the engine. This constant power is equal to the maximum rated horsepower of the conventional engine which would normally be utilized in such a vehicle driving application to provide the desired road speed and is initially achieved by the oversize engine at an intermediate speed, full throttle operating condition such as at half rated engine speed. The desired constant power regulation is a function of a decreasing torque characteristic with further increasing engine speed. Such a torque characteristic may be imposed on the oversize engine in any suitable manner, such as by modifying the quantities of air and fuel supplied to the several engine cylinders, the timing of fuel injection in a compression ignition type engine or of spark advance in a spark ignition type engine, or by a combination of such or other suitable means. In the illustrative embodiments of the invention herein described, this desired power regulation is accomplished by providing an engine speed-conscious governor which actuates a cam operable to directly control or limit the opening of a throttle valve mounted in the air intake manifold of a carbureted type, spark ignition engine.

By either automatically or manually effecting transmission gear shifts within the constant horsepower speed range of the engine, the equivalent of an infinitely variable ratio transmission is provided. Since the power output from the engine is maintained constant by the speed responsive mechanism on both sides of each shift point under such operating conditions, shift effected steps in output and vehicle speed such as occur with a conventional close stepped truck or highway tractor transmission are eliminated.

The speed-regulated torque characteristic of the proposed oversize engine is a constantly increasing increment increasing with decreasing engine speed over the upper half speed range of the engine. The low speed torque of such a large oversize engine is also substantially above that of an engine of a size conventionally used for such applications. Hence, the power plant of the invention provides substantially improved vehicle acceleration over the entire level road speed range of the vehicle. This is accomplished without a rugged, heavy and expensive multi-step transmission which would be required to safely and effectively transmit the maximum torque output otherwise available from such an oversize engine.

Another advantage of the invention is that substantially continual operation of the engine is provided within the upper half of its speed range under normal vehicle operating conditions with a minimum of shifting to provide desired road speed and acceleraion. This type of operation increases engine operating economy and reduces maintenance and service costs. While the cost and weight of the oversize engine will necessarily be greater than those of a smaller, low power/weight ratio engine conventionally used, the permitted simplifications of the transmission will result in the total cost and weight of the engine transmission power unit being substantially less than that of a conventional type installation. The instant invention has the added economic advantage of substantially reducing the number of engine transmission combinations which the individual manufacturer must otherwise necessarily provide to meet the wide range of size, load and operating requirements for various types of trucks, highway tractors, off-the-road equipment and other types of vehicles.

The foregoing and other advantages, objects and features of the invention will be more thoroughly understood from the following description of a preferred illustrative embodiment and a modification thereof having reference to the several drawings, in which:

FIGURE 1 is a somewhat simplified elevational view of a truck chassis including an internal combustion engine and a multi-speed transmission power unit incorporating a speed-conscious power regulating mechanism in accordance with the invention;

FIGURE 1a is a partial side elevational view further showing the speed-conscious power regulating mechanism of the invention as mounted in series with a conventional operator-controlled carburetor on the engine shown in FIGURE 1;

FIGURE 2 is an enlarged elevational view of the power regulating mechanism with portions thereof broken away and in section;

FIGURE 7 is a graph showing the engine performance characteristics imposed on the engine by the speed-conscious power regulating mechanism of the invention;

FIGURE 8 is a graph illustrating the transmission shift operation achieved by speed-conscious power regulation of the prime mover in accordance with the invention in comparison with that of a conventional engine-transmission power unit;

Figure 3:
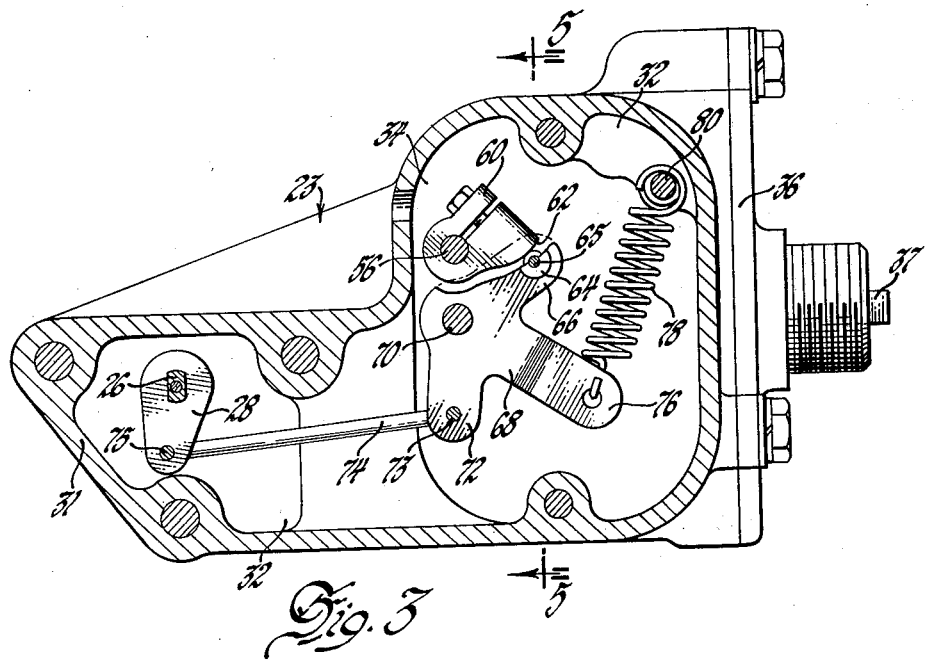
FIGURE 3 is a sectional view of the power regulating mechanism taken substantially on the line 3—3 of FIGURE 2.
Figure 4:
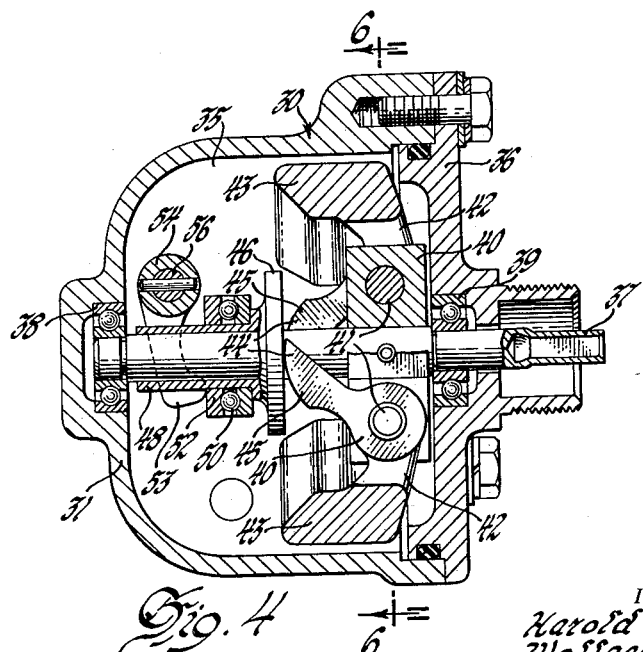
FIGURE 4 is a sectional view taken substantially in the plane of the line 4—4 of FIGURE 2.
Figure 5:
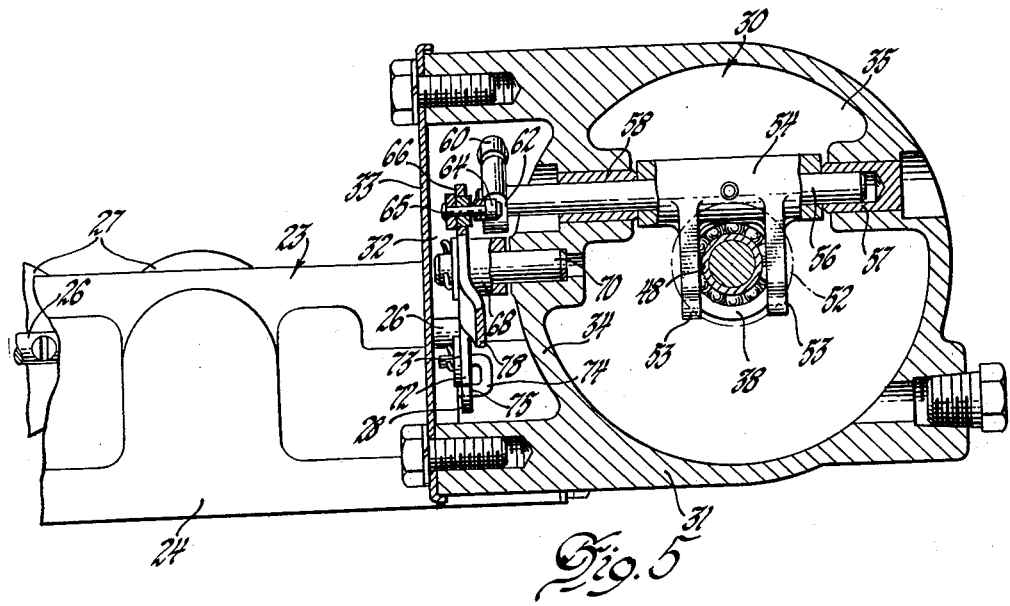
FIGURE 5 is a sectional view taken substantially in the plane of the line 5—5 of FIGURE 3.
Figure 6:
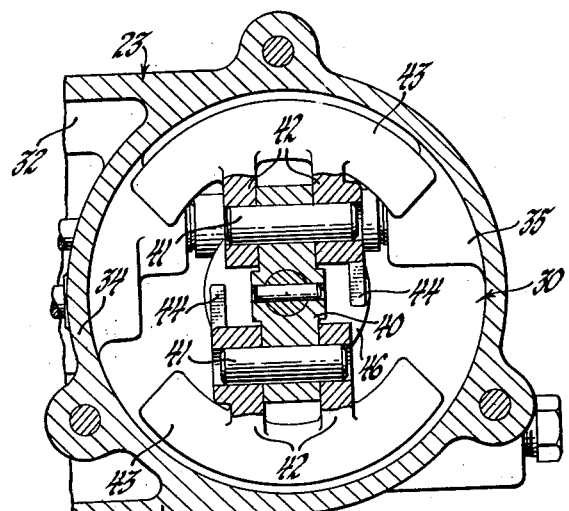
FIGURE 6 is a sectional view taken substantially in the plane of the line 6—6 of FIGURE 4.

Referring more particularly to FIGURE 1, the vehicle chassis is indicated generally by the numeral 10 and includes a frame 11 constisting of two longitudinally extending frame member 11' and a plurality of transverse or cross-frame members 11", 17 and 18. Front and rear wheels 12 and 13 are rotatably mounted on axle assemblies 14 and 15, respectively, which are carried by and support the frame 11 through conventional front and rear suspensions. An internal combustion engine 16 of a carbureted, spark-ignition type is supported in a conventional manner by cross members 17 and 18 of the vehicle frame. The engine 16 is drivingly connected through a transmission 19, a torque tube 20 and a differential gear drive unit 21 to the rear wheel driving axle assemblies 15. In accordance with the invention, the transmission 19 has only a limited number of change speed ratios. The engine 16 is provided with an intake manifold 22 which is connected to the individual cylinders and adapted to distribute a combustible mixture of fuel and air thereto from a fuel supply regulating, throttle controlled carburetor mechanism 29. As best seen in FIGURE 1a, a power regulating, engine speed responsive throttle mechanism 23 is interposed between the carburetor and the air intake manifold. An air intake silencer and cleaner assembly 29d is normally mounted on the carburetor 29. For simplicity of illustration both the carburetor 29 and the air intake silencer and cleaner assembly 29d have been removed in the top elevational view of FIGURE 1.

As shown in FIGURES 2-6, the engine speed responsive, power regulating throttle mechanism 23 comprises a valve housing 24 which is adapted to be mounted intermediate the inlet of the intake manifold 22 and the adjacent outlet end of the carburetor unit. The particular valve housing illustrated defines two inlet ducts 25 which mate with corresponding intake ducts of a two-barrel type carburetor 29. These carburetor ducts are controlled in a conventional manner by two throttle valves 29a which are interconnected by linkage 29b to an operator control 29c and movable thereby between engine idle speed and power closed positions and maximum speed and power wide-open positions. A valve shaft 26 journaled in the valve housing 24 diametrically intersects the two intake ducts 25. Two balanced butterfly type throttle valve plates 27 are suitably secured to the shaft 26 within the ducts 25 and are movable therewith between opened and closed positions to control the flow of combustible air-fuel mixture to the engine. One end of the valve shaft 26 projects outwardly of the valve housing 24 and has a valve actuating lever 28 nonrotatably secured thereto. The valve actuating lever 28 is operably connected to an engine speed responsive governor mechanism 30 which is suitably mounted on the adjacent end face of the valve housing member 24.

The governor mechanism 30 includes a housing member 31 which is recessed at one side thereof to define a chamber 32 with a cover plate 33 and the adjacent mounting end of the valve housing member 24. A partition wall 34 integral of the housing member 31 separates the chamber 32 from a second flyweight-mounting chamber 35 defined by the housing member 29 and a second cover or closure plate 36. A centrifugal weight mechanism is mounted within the housing chamber 35 and includes an engine-driven shaft 37 journaled in longitudinally spaced bearings 38 and 39 carried by the housing member 31 and the cover member 36, respectively. The shaft 37 is drivingly connected to the engine through a flexible shaft indicated at 37' in FIGURE 1. A flyweight carrier 40 is nonrotatably secured to the shaft 37 within the chamber 35. Two radially spaced parallel pins 41 carried by the member 40 pivotally support bifurcated arms 42 which extend radially inwardly from outer arcuately extending mass portions of two diametrically opposed bell crank flyweight members 43. The flyweight members 43 are thus pivotally mounted for speed responsive outward swinging. Inwardly of their pivotal mountings at 41 the flyweight members 43 are each provided with an arm extension 44 having a cam surface 45 thereon. The cam surfaces 45 are thrustably engageable with an annular flange 46 which is formed integrally of a riser sleeve 48.

The riser sleeve 48 is slidably mounted on the shaft 37 and carries a thrust type antifriction bearing 50. The race 52 of the bearing 50 opposite the flange 46 is rotatable relative to the riser sleeve 48 and thrustably engages yoked arms 53 of a lever member 54. The lever member 54 is non-rotatably secured to a shaft 56 intermediate bearings 57 and 58 which pivotally support the shaft 56 within the housing member 31. The bearing 57 journals the end of the shaft 56 adjacent the chamber 35 and the bearing 58 journals the shaft intermediate its ends. The end of the shaft 56 opposite the bearing 57 extends within the housing compartment 32 and has a lever member 60 nonrotatably secured thereto. A cam surface 62 on the lever 60 thrustably engages a roller 64 which is rotatably mounted on a pin 65 carried by one arm 66 of a three-arm bell crank lever 68. The lever 68 is pivotally supported by a pin 70 carried by the housing web 34. A second arm 72 of the lever 66 is connected at 73 to one end of a floating link 74, the distal end of which is connected at 75 to the valve actuating lever 28. The bell crank lever 68 is resiliently biased in a valve opening direction in opposition to the speed responsive centrifugal biasing action of the flyweights 43 by a helical speeder spring 78 which is tensively extended between the third arm 76 of the bell crank lever and a pin 80 which is carried by the housing 31 and retains the end of the spring 78 opposite the lever arm 76.

The cam surface 62 of the lever 60 is contoured in accordance with the invention to provide engine speed responsive closing of the valves 27 as shown by curve I of FIGURE 7. Such speed responsive valve regulation occurs between a predetermined intermediate and maximum engine speeds $E_f$ and $E_m$, respectively, and imposes a constant power, decreasing torque characteristic on the engine between such engine speeds. This governor regulated maximum engine torque is shown by the full line curve II and deviates from the maximum torque characteristics shown by the broken line curve II' which would otherwise normally be provided by the oversize engine 16 used for vehicle propulsion in accordance with the invention. Without the torque regulation provided by the speed responsive throttle valve mechanism 23, the normal torque characteristic for the oversize engine would normally provide an open throttle maximum horsepower curve similar to that indicated by the broken line curve III' between the engine speeds $E_f$ and $E_m$.

However, the decreasing torque characteristic provided by the contour of the cam surface 62 provides a maximum horsepower characteristic which is shown by the full line curve III having a substantially constant maximum horsepower between the engine speeds $E_f$ and $E_m$. This governor regulated constant maximum horsepower is equal to the maximum horsepower which would normally be obtained under wide open throttle conditions at the intermediate speed and further corresponds to the maximum horsepower required to provide the desired maximum level road speed. An engine of conventional size which would normally have been selected in the past to provide the maximum horsepower required for the desired maximum level road speed would have a wide open throttle maximum horsepower characteristic similar to that shown by the broken line curve III.''

Curve IV of FIGURE 8 illustrates the ideal maximum vehicle road velocity maintainable on a given grade or with a given road load having a given maximum engine horsepower available. This curve would be provided by an infinitely variable transmission, a long sought design goal, and is therefore designated by the legend "Infinitely Variable Transmission Performance." To approximate this ideal curve in conventional motor vehicle engine-transmission installations wherein the maximum horsepower is available only at or near maximum engine speed, it is necessary to provide a close stepped transmission. In heavy duty trucks, highway tractors and off-the-road equipment it is often necessary to provide numerous gear shift ratios. By way of example, 10 to 16 gear shift transmissions are frequently used in such applications with gear shifting being required at 3 and 4 m.p.h. increments. Such conventional transmission operation is shown by the broken-line, saw-toothed curve IV'. As indicated above such multiple stepped transmission units are necessarily complicated, heavy and expensive and in many cases far exceed the cost of the internal combustion engine with which they are combined.

In accordance with the invention, the constant maximum power regulated engine 16 may be used with a relatively simple and inexpensive two, three or four change speed transmission 19 which may be of either a manual or automatic shift type. Curve V is illustrative of the engine-road speed operating characteristic of such an engine-transmission unit including a transmission 19 having only four change speed gear ratios, e.g. 4.55; 2.75; 1.65; and 1 to 1 as indicated. The several gear shifts are effected at road speeds corresponding to $R_0$, $R_1$, $R_2$ and $R_3$. $R_0$ and $R_4$ designate the neutral or no road speed and maximum level road speed, respectively. It will be noted that the road speed shift points $R_1$, $R_2$ and $R_3$ properly occur as the engine approaches its intermediate and maximum speeds $E_f$ and $E_m$. Thus the several gear shifts are effected while the engine is operating within its constant horsepower range.

By way of example, as the engine speed decreases to $E_f$ with a corresponding reduction in road speed to $R_2$ with increasing grade, the transmission 19 may be shifted from its 1.65:1 ratio to its 2.75:1 ratio. This change in ratio permits the engine to accelerate to its maximum speed $E_m$ but with a corresponding governor controlled decrease in engine output torque. Since the engine will still be operating with the identical horsepower output but with decreased engine torque output, no discontinuity occurs from the infinitely variable transmission performance shown by curve V. This same type of operation can be effected at $R_3$ and $R_1$ with decreasing road speed with increasing grade or road load. Under increasing vehicle road speed conditions, similar shifts can be effected at $R_1$, $R_2$ and $R_3$ without discontinuity from the infinitely variable transmission performance curve.

From the foregoing it is seen that speed responsive decreasing torque regulation of the considerably oversized engine permits the use of a limited number of widely spaced road speed shift points $R_1$, $R_2$, etc. Thus an extremely simple transmission can be employed. Since the displacement of an engine can be increased more economically than the number of gear ratios in the transmission, this mode of operation results in a substantially more economical installation, provides increased low speed torque and horsepower, decreases the number of required shift operations, reduces operator fatigue, and permits more efficient vehicle operation. These several advantages are in addition to providing performance comparable to that which would be obtainable by an infinitely variable transmission.

Figure 9:
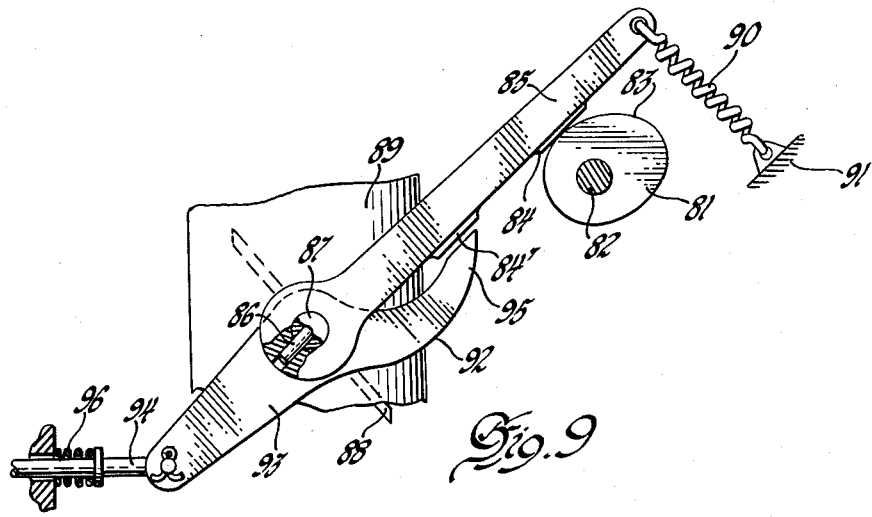
FIGURE 9 is an elevational view of a slightly modified form of the invention.

In the modified form of the invention shown in FIGURE 9, the engine speed responsive torque control is integrated with the throttle control linkage for a conventional carburetor. A cam 81 is secured for rotation with the power output shaft 82 of an engine speed responsive governor similar to that previously described and has a cam surface 83 thereon adapted to provide a speed responsive abutment stop for a pallet 84 carried by a throttle lever 85. One end of the throttle lever 85 is nonrotatably secured by a pin connection 86 to a shaft 87 rotatably mounting one or more throttle valve members 88 within corresponding intake duct defining barrels 89 of the carburetor unit. A spring 90 tensively interposed between a stationary member 91 and the opposite end of the throttle lever 85 biases the lever 85 in a valve opening clockwise direction toward abutment with the cam surface 83. A second lever 92 is journaled intermediate its end on the carburetor valve shaft 87. One arm 93 of the lever 92 is connected through a suitable linkage partially shown at 94 to a suitable manual control, such as an accelerator pedal. A second arm 95 of the lever 92 is adapted to engage a second pallet 84' on the throttle lever 85 to carry the throttle lever and valve in a valve closing direction upon counterclockwise rotation of the lever member 92. The linkage 94 and thus the pickup lever 92 are normally biased in a valve closing direction by a spring indicated at 96.

In this form of the invention, when the operator depresses the accelerator pedal to its full power position, the linkage 94 is actuated to the left against the biasing action of the spring 96 carrying the pickup lever 92 in a clockwise direction. This permits the spring 90 to bias the throttle lever 85 to its full power, valve open position wherein the pallet 84 abuts the base circle of the cam surface 83 as shown in FIGURE 9. As the engine speed increases to the intermediate engine speed $E_f$, speed responsive movement of the governor shaft 82 causes the cam 81 secured thereto to carry the throttle control lever 85 in a valve closing, torque decreasing direction. As in the preceding embodiment, the cam surface 83 is contoured to provide constant maximum horsepower by first decreasing and then increasing the permitted throttle opening thereby providing the desired constant power, decreasing torque function with increasing engine speed.

Figure 10:
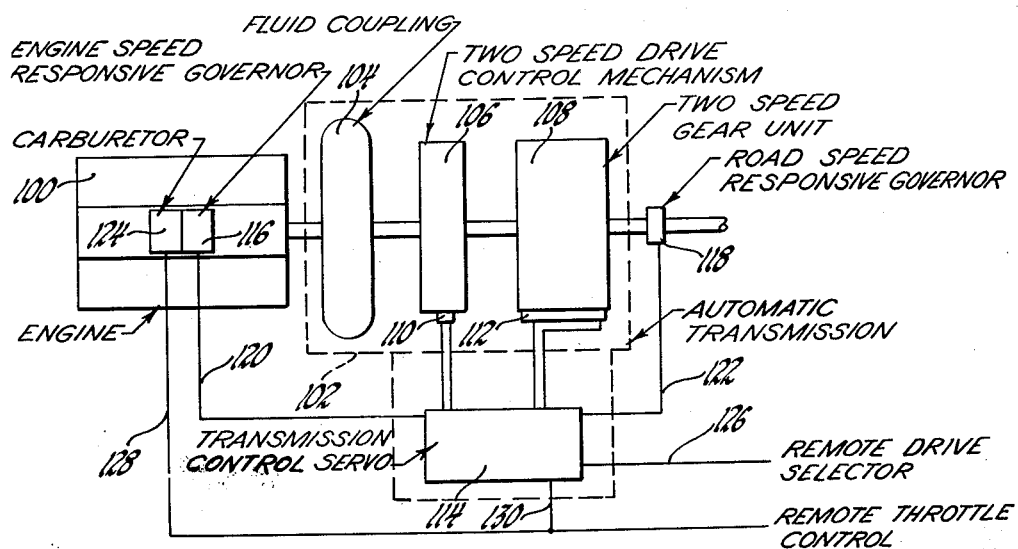
FIGURE 10 is a diagrammatic view showing the application of the invention to a motor vehicle power plant including an internal combustion engine and an automatic transmission.

In the form of the invention shown in FIGURE 10, the engine 100 is connectable to drive the vehicle through an automatic transmission 102 which may include a fluid coupling 104, a two-speed drive control mechanism, and a two-speed gear unit 108. The drive control mechanism 106 may be of a type having a planetary gear drive with suitable clutch or brake mechanisms operable to establish the effective drive ratio through such planetary gearing. Means for selectively operating such clutch or brake mechanisms is indicated at 110. The two-speed gear unit is similarly provided with means 112 operable to shift the drive ratio of the gear unit. The overall drive ratio through the transmission is effected by the selective energization of the means 110 and 112 through the operation of a transmission control servo unit indicated at 114. The operation of the transmission control servo is normally automatically accomplished in response to engine and vehicle road speed signals supplied thereto by an engine speed responsive governor 116 and a road speed responsive governor 118 operably connected thereto as indicated at 120 and 122, respectively.

In addition to its transmission control function, the engine speed responsive governor 116 is operably associated with the engine carburetor 124 to regulate the power output of the engine in the same manner as previously described with reference to the embodiments of FIGURES 1–6 and FIGURE 9. The throttle valve of the carburetor 124 is operably connected by a suitable linkage indicated at 128 to a remote throttle control, such as an accelerator pedal. The transmission control servo may be provided with a conventional throttle responsive down shift means suitably connected as indicated at 130 to the throttle control linkage 128. The transmission control servo 114 is also operably connected as indicated at 126 to a remote drive selector means operable to override the automatic change speed control signals of the engine and road speed responsive governors in a conventional manner.

Except for the automatic operation of the transmission 102, the speed responsive regulation of engine torque and power with this form of the invention is the same as that previously described thereby permitting the use of a relatively simple and inexpensive automatic transmission unit having only a relatively limited number of change speed ratios.

From the foregoing description of the several illustrative embodiments of the invention, it will be seen that infinitely variable type transmission performance is achieved in accordance with the invention using only conventional engine and change speed transmission units. The high speed torque characteristic imposed upon the oversize engine of such a power plant combination permits the use of higher engine compression ratios with a resultant increase in the low speed engine torque characteristic and without detonation at higher engine speeds. Such a power plant combination also provides optimum vehicle operating economy and vehicle speed and power regulation and constitutes a relatively simple and inexpensive means for accomplishing the several other objects and advantages of the invention mentioned above.

It will be obvious to those skilled in the art that various changes or modifications of the several illustrative embodiments may be made without departing from the spirit and scope of the invention as defined in the following claims.

We claim:

1. In a motor vehicle, a power plant for driving said vehicle comprising a vehicle propelling means, a variable speed internal combustion engine operable through a speed range between a minimum idle speed limit and a maximum speed limit, transmission means for drivingly connecting said engine to said vehicle propelling means, said transmission means including means for establishing a limited number of stepped drive ratios between said engine and vehicle propelling means and means for selectively actuating said drive ratio establishing means, said engine being of a size and operating characteristic to provide a horsepower level at a speed intermediate said idle and maximum speed limits sufficient to drive said vehicle at a desired maximum level road speed, and means operable in accordance with the speed of said engine to impose a decreasing torque characteristic on said engine between said intermediate and said maximum engine speeds to maintain the horsepower output of said engine therebetween substantially constant at said intermediate speed horsepower level thereby providing infinitely variable type transmission performance between said engine and said vehicle propelling means and preventing road speed discontinuity during transmission drive ratio changing operation when said engine is operating between said intermediate and maximum speeds.

2. In a motor vehicle, a power plant for driving said vehicle comprising an engine operable between a minimum idle speed limit and a maximum speed limit, said engine having operating characteristics providing a horsepower level sufficient to drive said vehicle at a desired maximum level road speed at an engine speed intermediate said idle and maximum engine speeds, transmission means for drivingly connecting said engine to drive said vehicle and including means for selectively establishing a limited number of stepped drive ratios therethrough, and means associated with said engine and independent of said transmission means for imposing a decreasing torque characteristic between said intermediate and said maximum engine speeds to maintain the horsepower output of said engine therebetween substantially constant at said intermediate speed horsepower level thereby preventing road speed discontinuity during transmission drive ratio changing operation and providing infinitely variable type transmission performance from said power plant when said engine is operating between said intermediate and maximum speeds.

3. A power plant for driving a variable load mechanism at variable speeds comprising an internal combustion engine operable through a speed range between a minimum idle speed limit and a maximum speed limit, transmission means for drivingly connecting said engine to drive said load mechanism and operable to selectively establish a limited number of different drive ratios therebetween, said engine having an operating characteristic providing a horsepower output level sufficient to drive said load mechanism at a desired maximum speed at an engine speed intermediate said idle and maximum speed limits, and means independent of said transmission means for imposing a decreasing torque characteristic on said engine between said intermediate and said maximum engine speeds to maintain the horsepower output of said engine therebetween substantially constant at said intermediate horsepower level thereby providing load speed continuity and infinitely variable type transmission performance between said engine and said load mechanism during drive ratio changing operation of said transmission when said engine is operating between said intermediate and maximum speeds.

4. A power plant for driving a variable load mechanism comprising an engine, means operable to control the speed and power output of said engine between a minimum idle speed and a maximum speed limit, transmission means for drivingly connecting said engine to drive said load mechanism and operable to selectively establish a limited number of different drive ratios therebetween, said engine having an operating characteristic providing a horsepower output level sufficient to drive said load mechanism at a desired maximum speed at an engine speed intermediate said idle and maximum engine speed limits, and means responsive solely to the speed of said engine and operable on said speed and power control means to impose a decreasing torque characteristic on said engine between said intermediate and said maximum engine speeds to maintain the horsepower output of said engine therebetween substantially at said intermediate horsepower level thereby providing load speed continuity during drive ratio changing operation of said transmission when said engine is operating between said intermediate and maximum speeds.

5. In a power plant, an engine, a first means operable to control the speed and power output of said engine between a minimum idle speed and a maximum speed limit, transmission means for drivingly connecting said engine to drive a load mechanism and operable to selectively establish a limited number of different drive ratios therebetween, said engine having an operating characteristic providing a horsepower output level sufficient to drive said load mechanism at a desired maximum speed at an engine speed intermediate said idle and maximum engine speed limits, and a second means responsive to the speed of said engine and operable independently of said first speed and power control means to regulate the torque characteristic of said engine between said intermediate and said maximum engine speeds to maintain the horsepower output of said engine therebetween substantially at said intermediate horsepower level whereby load speed continuity is provided during drive ratio changing operation of said transmission when said engine is operating between said intermediate and maximum speeds.

6. In a power plant, an engine, means operable to control the speed and power output of said engine between a minimum idle speed limit and a maximum speed limit, transmission means operable to drivingly connect said engine to drive a load mechanism and operable to selectively establish a limited number of different drive ratios therebetween, said engine having an operating characteristic providing a hosepower output level sufficient to drive said load mechanism through said transmission at desired maximum speed levels at an engine speed intermediate said idle and maximum engine speeds, means controllable by an operator to actuate said engine speed and output control means to control the speed and power output of said engine, and means responsive to the speed of said engine and operable on said engine speed and output control means to override actuation thereof by said operator controllable means and to reduce the output torque characteristic of said engine between said intermediate and said maximum engine speeds to maintain the horsepower output of said engine therebetween substantially at said intermediate horsepower level whereby load speed continuity is provided during drive ratio changing operation of said transmission when said engine is operating between said intermediate and maximum speeds.

7. In a motor vehicle, a power plant for driving said vehicle including a vehicle propelling means, an engine operable between a minimum idle speed limit and a maximum speed limit, transmission means for drivingly connecting said engine to said vehicle propelling means, said transmission means including means for automatically establishing a limited number of stepped drive ratios between said engine and vehicle propelling means in accordance with the relative speeds of said engine and of said vehicle, said engine being of a size and operating characteristic to provide a horsepower level at a speed intermediate said idle and maximum speed limits sufficient to drive said vehicle at a desired maximum level road speed, and means operable to impose a decreasing torque characteristic on said engine between said intermediate and said maximum engine speeds to maintain the horsepower output of said engine therebetween substantially at said intermediate speed horsepower level thereby providing road speed continuity during drive ratio changing operation of said transmission when said engine is operating between said intermediate and maximum speeds.

8. In a power plant, an engine, a first means including a first throttle valve member movable to control the speed and power output of said engine between a minimum idle speed and a maximum speed limit, transmission means for drivingly connecting said engine to drive a load mechanism and selectively operable to establish a limited number of different drive ratios therebetween, said engine having an operating characteristic providing a horsepower output level sufficient to drive said load mechanism at desired maximum speed levels at an engine speed intermediate said idle and maximum speed limits, and a second means including a second throttle valve member movable to control the speed and power output of said engine independently of said first speed and power control means, and means responsive to the speed of said engine and operable on said second throttle valve member to regulate the torque characteristic of said engine between said intermediate and said maximum engine speeds to maintain the horsepower output of said engine therebetween substantially at said intermediate horsepower level whereby road speed continuity is provided during drive ratio changing operation of said transmission when said engine is operating between said intermediate and maximum speeds.

9. In a power plant, an engine, means including a throttle valve member operable to control the speed and power output of said engine between a minimum idle speed limit and a maximum speed limit and means controllable by an operator to actuate said throttle valve member, transmission means operable to drivingly connect said engine to drive a load mechanism and selectively operable to establish a limited number of different drive ratios therebetween, said engine having an operating characteristic providing a horsepower output level sufficient to drive said load mechanism at desired maximum speed levels at an engine speed intermediate said idle and maximum engine speeds, and means responsive to the speed of said engine and operable to override actuation of said throttle valve member by said operator controllable means to reduce the output torque characteristic of said engine between said intermediate and said maximum engine speeds to maintain the horsepower output of said engine therebetween substantially at said intermediate horsepower level whereby road speed continuity is provided during drive ratio changing operation of said transmission when said engine is operating between said intermediate and maximum speeds.

References Cited in the file of this patent
UNITED STATES PATENTS

| | | |
|---|---|---|
| 2,713,800 | Forster | July 26, 1955 |
| 2,771,788 | Frick et al. | Nov. 27, 1956 |